United States Patent [19]
Poggio et al.

[11] Patent Number: 5,642,431
[45] Date of Patent: Jun. 24, 1997

[54] NETWORK-BASED SYSTEM AND METHOD FOR DETECTION OF FACES AND THE LIKE

[75] Inventors: Tomaso Poggio, Wellesley; Kah-Kay Sung, Cambridge, both of Mass.

[73] Assignee: Massachusetts Institute of Technology, Cambridge, Mass.

[21] Appl. No.: 478,395

[22] Filed: Jun. 7, 1995

[51] Int. Cl.$^6$ .................................................. G06K 9/00
[52] U.S. Cl. ...................... 382/118; 382/115; 235/380; 348/77
[58] Field of Search .................................. 382/118, 227, 382/317, 115; 235/380; 348/77

[56] References Cited

U.S. PATENT DOCUMENTS

| | | | |
|---|---|---|---|
| 4,975,969 | 12/1990 | Pal | 382/118 |
| 5,012,522 | 4/1991 | Lambert | 382/118 |
| 5,164,992 | 11/1992 | Turk et al. | 382/118 |
| 5,414,781 | 5/1995 | Spitz et al. | 382/317 |
| 5,450,504 | 9/1995 | Calia | 382/118 |

FOREIGN PATENT DOCUMENTS

WO9208202  5/1992  European Pat. Off.  ......... G06K 9/00

*Primary Examiner*—Jose L. Couso
*Assistant Examiner*—Anh Hong Do
*Attorney, Agent, or Firm*—Stuart P. Meyer, Esq.

[57]                    ABSTRACT

A face detection system (100) includes an imaging device, a computer having a pattern prototype synthesizer and an image classifier, and an output display device. Face and non-face pattern prototypes are synthesized by a network training process using a number of example images. A new applied image is analyzed by taking a distance from the applied image to each of the prototypes, and a decision is made as to whether the applied image contains a face based on the distances thus obtained. The system and method may be applied to various other detection tasks.

19 Claims, 6 Drawing Sheets

NETWORK-BASED SYSTEM AND METHOD FOR DETECTION OF FACES AND THE LIKE

SUBJECT INVENTION

The present invention is a subject invention under contracts N00014-91-J-1270, N00014-92-J-1879, N00014-91-J-4038 and ASC-9217041 with the United States Government, and as such the United States Government has rights therein.

FIELD OF THE INVENTION

The present invention relates generally to image analysis using artificial intelligence, and specifically to a system and method for analyzing images to detect human faces therein, using a trained neural network.

DESCRIPTION OF BACKGROUND ART

Numerous schemes have been proposed to detect, recognize, and synthesize target images. The task of detection involves determining whether a target image is present in an input image. The task of recognition involves determining whether a detected target image matches one of a set of model images. The task of synthesis involves creating a target image based on certain desired characteristics or parameters of the target image.

The example of human face detection, recognition and synthesis is of considerable practical importance. For instance, numerous applications could benefit from automatic determination of whether a photograph (or video frame or other image) contains a human face and, if so, whose face it is. Detection of other known patterns, such as dust particles, metallurgical fissures, tumors, firearms, buildings, automobiles and the like may be desirable in countless other industrial, medical, academic and government applications. In many such applications, the target patterns may include significant variations, may not be rigid, may not be geometrically parameterizable, and may not be imaged under conditions controllable by the user.

Traditionally, face detection has been performed using either correlation templates or spatial image invariants. Correlation template techniques compute a similarity measurement between a fixed target pattern and candidate image locations. If the measurement exceeds a threshold value, a "match" is declared, indicating that a face has been detected. Multiple correlation templates may be employed to detect major facial subfeatures. A related technique is known as "view-based eigen-spaces," and defines a distance metric based on a parameterizable sub-space of the original image vector space. If the distance metric is below a threshold value, a face is detected.

Image invariance schemes for face detection rely on compiling a set of image invariants particular to facial images. The input image is then scanned for positive occurrences of these invariants at all possible locations.

Unfortunately, there is enough variability in images of human faces that neither the correlation templates nor image invariants techniques provides sufficiently robust results for general application.

A need remains, therefore, for a system and method of detecting image patterns such as faces that can be made more robust than known techniques. It would be desirable for such a system and method to be independent of domain-specific knowledge or special hand-crafting techniques to build face models. It would also be preferable for such a system and method to avoid the need to derive operating parameters and thresholds manually from a few trial cases.

No such system or method is known to have been previously developed. Accordingly, there remains a need for an improved system and method that can be used for detecting human faces or other desired objects in applied images.

DISCLOSURE OF INVENTION

In accordance with the present invention, a system (100) for detecting human faces includes a pattern prototype synthesizer (104) having a preprocessor (140), an image database (150), and a prototype generator (160). The preprocessor (140) normalizes and filters input images. The image database (150) stores face and non-face example patterns. The prototype generator (160) produces face prototypes and non-face prototypes. The system (100) also includes an image classifier (106) having a distance metric processor (302) and a network (304). The distance metric processor (302) produces a two-value distance measure between the applied image and each of the prototypes. The network (304) processes this distance information to produce a detection signal (340) indicative of whether a face has been detected in the applied image.

In accordance with another aspect of the invention, a method of detecting faces in an applied image includes synthesizing a network and operating a network. The network is synthesized by collecting a number of example images corresponding to faces, generating a set of face prototypes using the example images, generating a set of non-face prototypes, and training the network by applying images known to either contain, or not contain, a face pattern. The network is operated by preprocessing the applied image, determining a distance metric between the preprocessed image and the each of the prototypes, applying the distance metrics to the network, and producing a detection signal indicative of whether the applied image is representative of a face pattern.

In yet another aspect of the invention, the distance metric used contains two components, one based on a Mahalanobis distance and the other based on a Euclidean distance.

In still another aspect of the invention, non-face prototypes are obtained by populating a database of non-face examples with images in which faces are falsely detected when the network is operated using only face prototypes.

In a further aspect of the invention, the applied image is scaled and scanned into a number of uniformly sized windows that are applied to the network.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BEST MODE FOR CARRYING OUT THE INVENTION

The figures depict a preferred embodiment of the present invention for purposes of illustration only. Those skilled in the art will readily recognize from the following discussion that alternative embodiments of the structures and methods illustrated herein may be employed without departing from the principles of the invention described herein.

Figure 1:
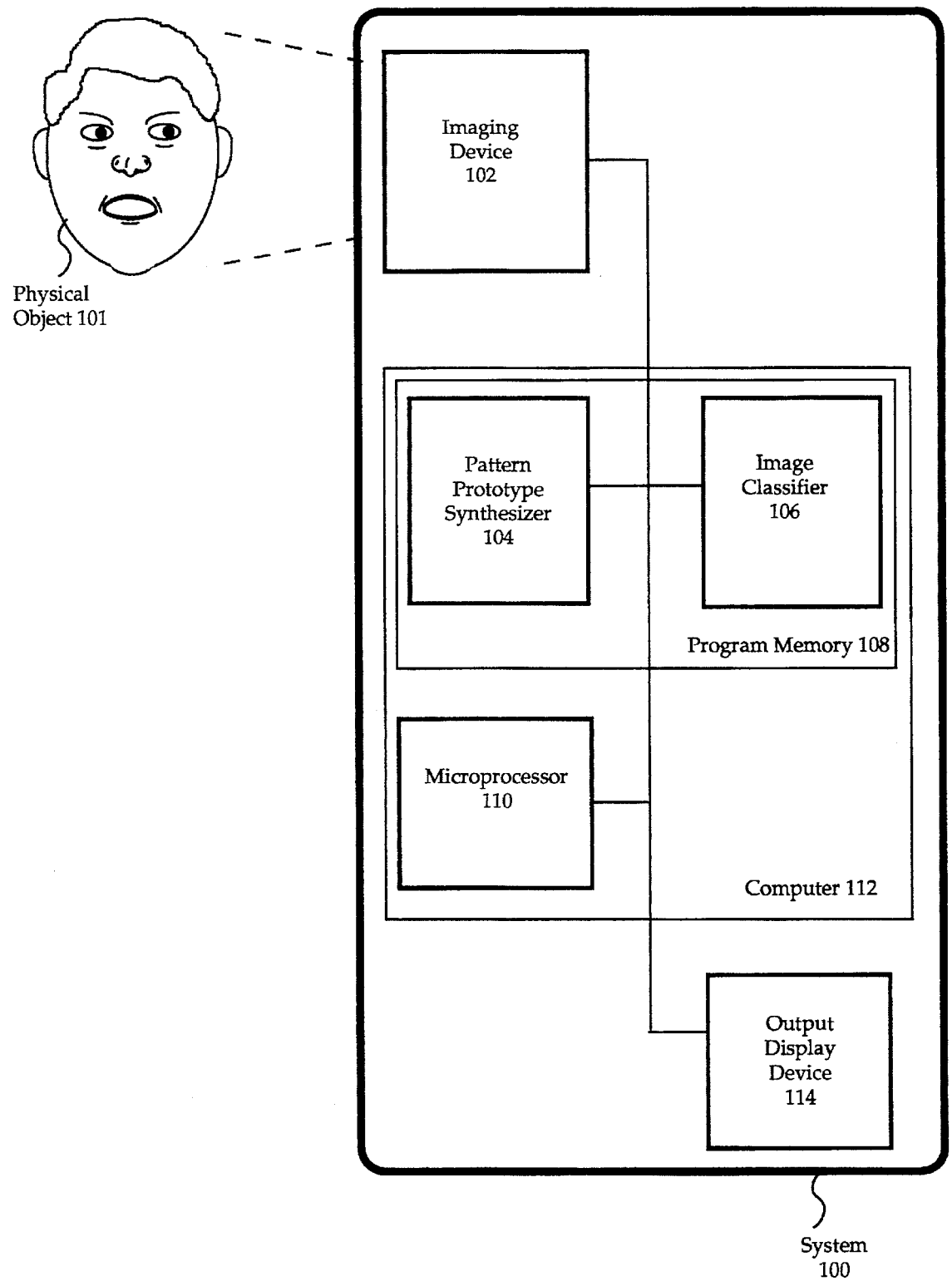
FIG. 1 illustrates a system (100) for the detection of faces in images, in accordance with the present invention.

Referring now to FIG. 1, there is shown a system 100 for detecting faces in images in accordance with the present invention. The primary components of system 100 include an imaging device 102, a computer 112 including a microprocessor 110 and a program memory 108 in which are stored computer instructions for implementing a pattern prototype synthesizer 104 and an image classifier 106, and an output display device 114.

Briefly, in operation imaging device 102 captures an image of a physical object 101, e.g., a human face, and converts the image into a signal suitable for processing. Pattern prototype synthesizer 104 creates face and non-face prototypes from sample images applied to imaging device 102, which prototypes are then used by image classifier 106 to detect whether a new image applied to imaging device 102 contains a face. The results of such processing are then provided as output for a user by output display device 114.

The system 100 illustrated in FIG. 1 is taught to recognize face patterns from examples, which are used to discover a set of internal operating parameters and thresholds that empirically are found to separate face patterns from non-face patterns. The performance of system 100 may be made more or less robust by changing the size and variety of example images applied to system 100.

Because faces are essentially structured objects with the same key features geometrically arranged in roughly the same fashion, it is possible to define a semantically stable "canonical" face pattern in the image domain for the purpose of pattern matching.

System 100 detects faces by scanning an applied image for such canonical face-like patterns at all possible scales. At each scale, the applied image is divided into multiple, possibly overlapping sub-images based on a current window size. At each window, system 100 attempts to classify the enclosed image pattern as being either a face or not a face. Each time a face window pattern is found, the system reports a face at the window location, and the scale as given by the current window size. Multiple scales are handled by examining and classifying windows of different sizes or, as implemented in a preferred embodiment, by working with fixed sized window patterns on scaled versions of the image.

System 100 learns a functional mapping of input pattern measurements to output classes from a representative set of face and non-face window patterns as detailed below. In short, window patterns of any dimension are re-scaled to a fixed size. A relatively small number of face and non-face window pattern prototypes are used to approximate the distribution of canonical face patterns and to serve as a view-based model for the class of canonical face patterns.

The pattern prototypes are synthesized before run-time operation of system 100 from an example database of face patterns and an example database of non-face patterns. In a preferred embodiment, six face prototypes and six non-face prototypes are used. Each such prototype is encoded as a multi-dimensional cluster with a centroid location and a covariance matrix describing local data distribution around the centroid. For each new window pattern to be classified, a set of image measurements is determined for use by image classifier 106. Each set of such image measurements is a vector of distances from the new window pattern to the prototype window patterns in the image window vector space. A two-value distance metric is used to measure distances between the input window pattern and the prototype centers in a preferred embodiment. This metric takes into account the shape of each prototype cluster in order to penalize distances that are orthogonal to the local data distribution. A multi-layer perceptron (MLP) network 304, discussed in connection with FIG. 3, identifies new window patterns as faces or non-faces by taking as input a vector of distance measurements and outputting either a first state, if the vector arises from a face pattern, or a second state, if the vector arises from a non-face pattern.

The various subsystems of system 100 may be implemented by a variety of combinations of dedicated circuitry and programmed general purpose computer circuitry. Each subsystem of system 100 will be discussed in turn.

Imaging device 102 is configured to produce a signal, typically in digital electronic form, corresponding to the image of a physical object 101. In one embodiment, imaging device 102 is implemented using a digital video camera. In another embodiment particularly suited to processing printed objects such as photographs, imaging device 102 is implemented using a digital scanner. In accordance with the present invention, virtually any means of obtaining a signal representing a physical object may be used for imaging device 102.

In a preferred embodiment, pattern prototype synthesizer 104 and image classifier 106 are implemented by stored program instructions, in program memory 108, that direct the operation of computer 112. These program instructions may be stored on a magnetic disk or other suitable means of storage. It should be recognized that pattern prototype synthesizer 104 and image classifier 106 could also be implemented in other ways, for instance by use of dedicated electronic circuitry.

In a preferred embodiment, computer 112 is a conventional microcomputer using a conventional microprocessor 110, and output display device 114 is a conventional computer video monitor. As mentioned above, however, it should be recognized that other implementations of the various subsystem comprising system 100 could also be used.

Figure 2:
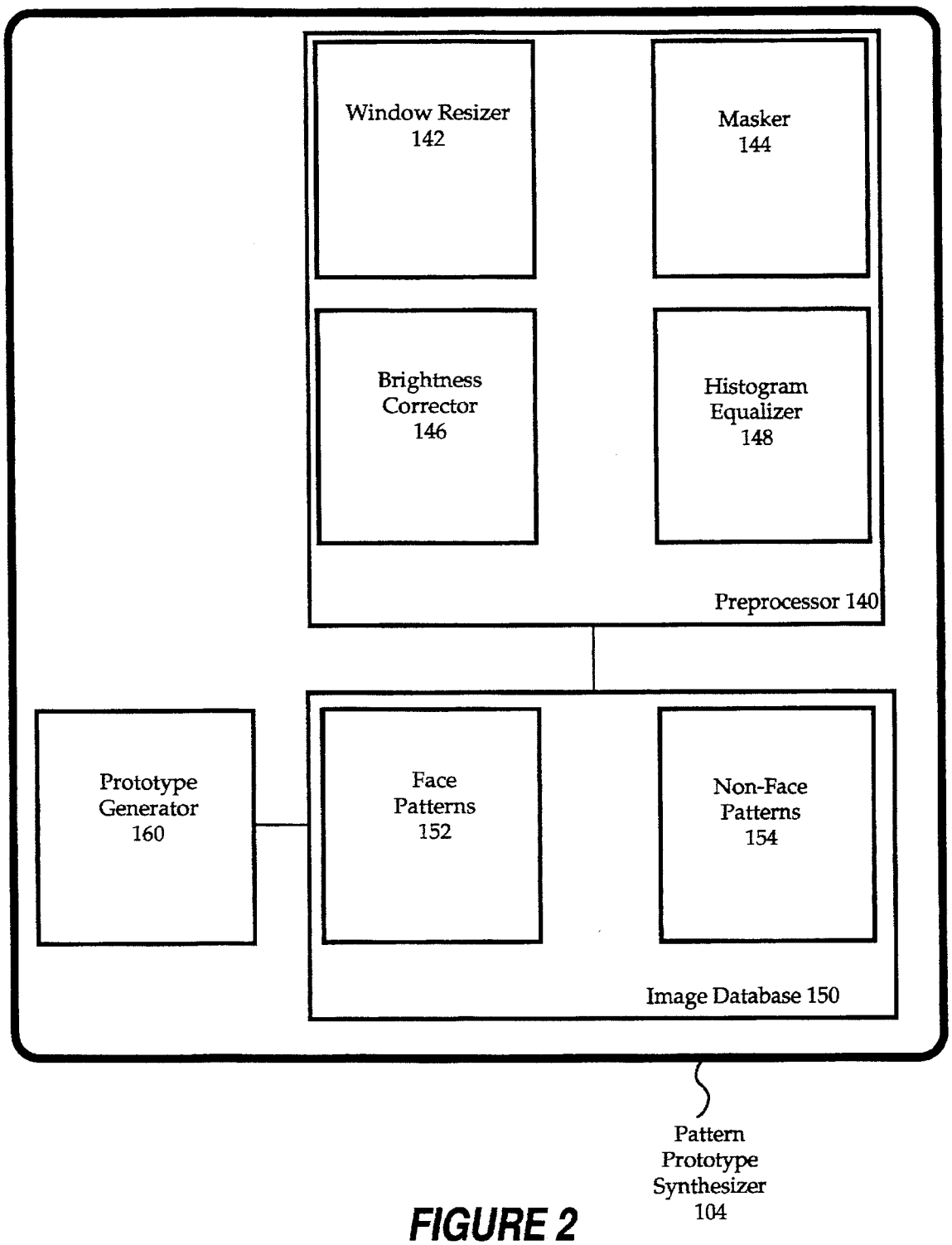
FIG. 2 illustrates a pattern prototype synthesizer (104), in accordance with the present invention.

Referring now to FIG. 2, there are shown the various components of pattern prototype synthesizer 104. These components include a preprocessor 140, an image database 150, and a prototype generator 160. Preprocessor 140 includes a window resizer 142, a masker 144, a brightness corrector 146, and a histogram equalizer 148. Image database 150 includes a face pattern section 152 and a non-face pattern section 154, and stores example face images and example non-face images in each of those respective sections.

Preprocessor 140 is used to normalize sample window patterns to compensate for certain sources of image variation. Preprocessor 140 reduces the range of possible window patterns that will be applied for subsequent processing, thereby simplifying such subsequent processing. The operation of the components of preprocessor 140 is described in connection with FIG. 3. Briefly, window resizer 142 re-scales window patterns of different sizes to be 19 pixels by 19 pixels. Masker 144 masks those pixels outside the area of interest in recognizing a face, as such near-boundary pixels are not found to contribute to detection. Specifically, those pixels in the corners of the 19×19 window are masked, as human faces are generally ovoid rather than square in shape and no significant useful information would be expected from these corner pixels. Brightness corrector 146 reduces the strength of heavy shadows by subtracting a best-fit brightness plane from the unmasked window pixels. Histogram equalizer 148 adjusts for geometry independent sources of window pattern variation, including changes in illumination brightness and differences in camera response curves.

Preprocessor 140 is used to operate on image information from imaging device 102 not only during synthesis of face and non-face prototypes, but also at run-time when system 100 is used for detecting an applied image.

In a preferred embodiment, image database 150 contains several thousand normalized canonical face patterns that are used to synthesize the six face pattern prototypes mentioned above. In a preferred embodiment, these several thousand face patterns are obtained by applying approximately one thousand real face patterns from various image sources, as well as slightly rotated versions of those images and their mirror-images, to system 100.

The six representative face pattern prototypes are obtained by use of a k-means clustering technique that provides not only the six prototypes, but also corresponding cluster covariance matrices. The clustering technique makes use of a conventional k-means technique modified by use of an adaptively changing normalized Mahalanobis distance metric, detailed below, rather than a conventional Euclidean distance metric for partitioning of data samples into clusters. The use of this distance metric takes into account that face data clusters may be more elongated along certain directions of the image window vector space than others, and accordingly reduces the penalty for pattern differences along a cluster's major axes of elongation. This clustering technique is outlined as follows:

1. Obtain k (six in this case) initial pattern centers by performing vector quantization with Euclidean distances on the enlarged face database. Divide the data set into k partitions, or clusters, by assigning each data sample to the nearest pattern center in Euclidean space.

2. Initialize the covariance matrices of all k clusters to be the identity matrix.

3. Determine revised pattern centers as the centroids of the current data partitions.

4. Using the current set of k pattern centers and their cluster covariance matrices, determine revised data partitions by re-assigning each data sample to the nearest pattern center in normalized Mahalanobis distance space. If the data partitions remain unchanged or if the maximum number of iterations of steps 3 and 4 has been exceeded, go to step 5; otherwise return to step 3.

5. Determine revised covariance matrices of all k clusters from their respective data partitions.

6. Using the current set of k pattern centers and their cluster covariance matrices, determine revised data partitions by re-assigning each data sample to the nearest pattern center in normalized Mahalanobis distance space. If the data partitions remain unchanged or if the maximum number of iterations of steps 3 through 6 has been exceeded, go to step 7; otherwise return to step 3.

7. Return the current set of k pattern centers and their cluster covariance matrices.

It should be recognized that the processing loop of steps 3 and 4 is analogous to the conventional k-means technique. Given a fixed distance metric, it finds a set of k pattern prototypes that partitions the sample data set in a stable manner. In a preferred embodiment, the cluster shapes are then refined and recovered in an iterative manner through steps 5 and 6.

With respect to the section 154 of image database 150 in which non-face patterns are stored, it should be recognized that there are numerous naturally occurring non-face patterns in the real world that look somewhat like faces when viewed in isolation. Some of these non-face patterns may even be located nearer the face pattern prototypes in the image window vector space than some real face patterns. Thus, misclassification would result if an assumption were to be made that only real face patterns are located near the face pattern prototypes.

To avoid such misclassifications, a distribution of exemplary non-face patterns that lie near face pattern prototypes is explicitly modeled using six non-face prototypes. These non-face prototypes provide negative regions around the face prototypes that do not correspond to face patterns. Each time a new window pattern is found that lies sufficiently close to a non-face prototype, a non-face hypothesis is favored even if the pattern also lies close to a face prototype.

In a preferred embodiment, the modified k-means clustering technique described above is used to generate six non-face prototypes and their cluster covariance matrices from a database of several thousand face-like patterns. In a preferred embodiment, the non-face patterns in section 154 are generated in a "boot-strap" fashion by first building a reduced version of system 100 with only face prototypes and collecting false positive patterns that such a system detects over a large set of random images.

Figure 3:
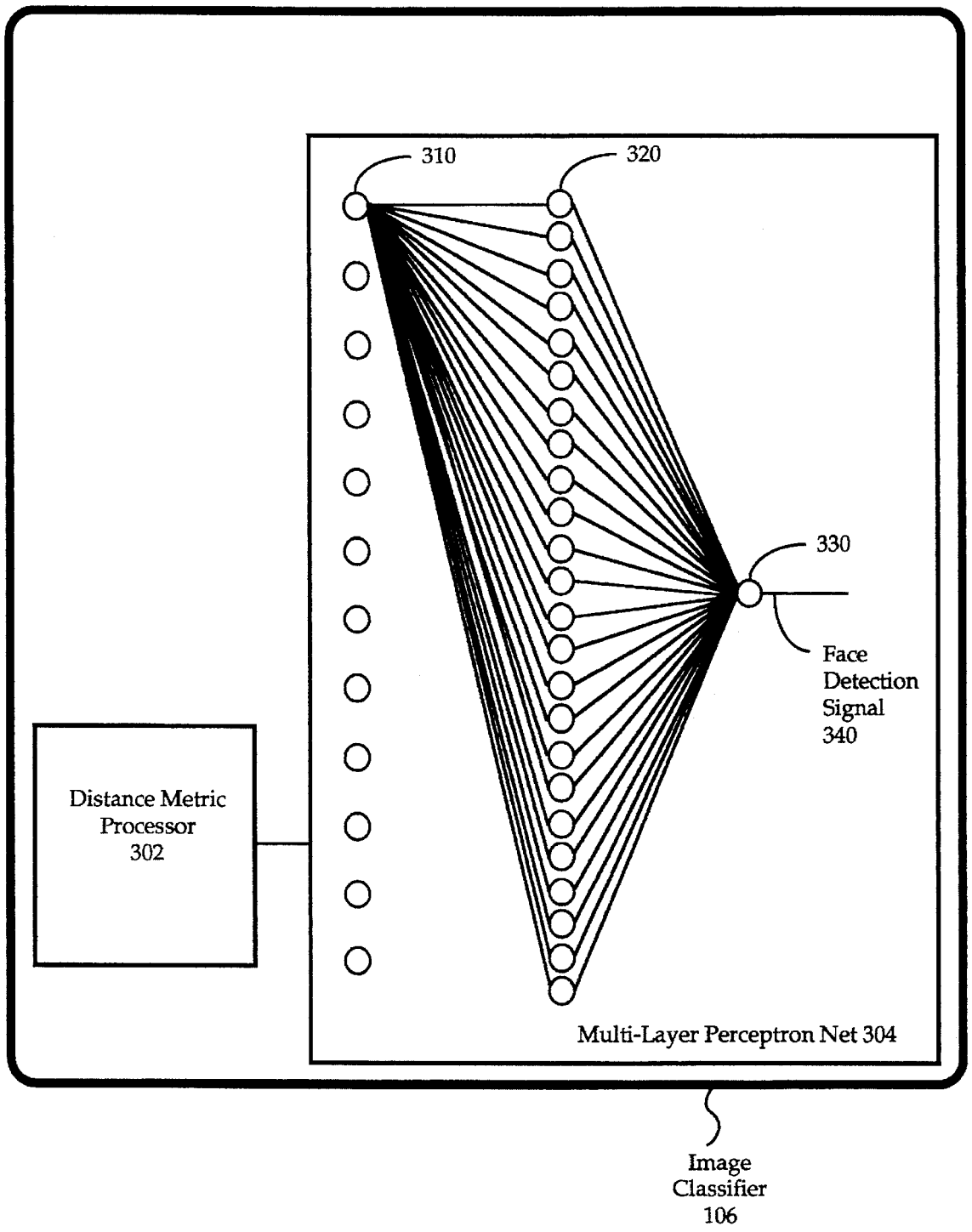
FIG. 3 illustrates an image classifier (106), in accordance with the present invention.

Referring now to FIG. 3, the major subsystems of image classifier 106 are illustrated. Image classifier 106 includes a distance metric processor 302 and MLP net 304. In a preferred embodiment, MLP net 304 is a conventional neural network processing subsystem trained using conventional backpropagation, and includes 12 pairs of input terminals, e.g., 310, 24 hidden units, e.g., 320, and one output unit 330 that provides a face detection signal 340.

The task of image classifier 106 is to identify face window patterns from non-face window patterns based on their distance readings to the twelve prototype centers. In a preferred embodiment, this task is treated as one of learning a functional mapping from input distance measurements to output classes using a representative set of training examples.

Each of the hidden units, e.g., 320, as well as output unit 330, determines a weighted sum of its input links and performs conventional sigmoidal thresholding on its output. During classification, MLP net 304 is provided a vector of the current test pattern's distance measurements to the 12 prototype centers. Each input terminal pair, e.g., 310, receives the distance values for a designated prototype pattern. Output unit 330 generates a face detection signal 340 that, in a preferred embodiment, is a "1" if the input distance vector arises from a face pattern and a "0" otherwise.

In a preferred embodiment, the hidden units, e.g., 320, are partially connected to input terminals, e.g., 310 and the output unit 330 in order to exploit a-priori knowledge of the problem domain. In practice, the performance of image classifier 106 is found to be not very sensitive to the number of hidden units, e.g., 320, and the connectivity structure of MLP net 304.

In practice, it is also found that the performance of image classifier 106 is made more robust by increasing the quality and number of examples used in training MLP net 304. Conventionally, the performance of neural network processors is enhanced by providing as large a set of training examples as possible to attain a comprehensive sample of the input space, constrained by limitations of disk space and available computation resources.

In the case of face patterns, a preferred embodiment employs as many images of faces as are readily available, for instance from "mug shot" and other image sources. These examples are augmented by adding virtual examples obtained by taking mirror images of the examples and by applying slight rotational warping of the examples.

In the case of non-face patterns, a preferred embodiment concentrates on those non-face patterns that have high informational value, i.e., those that share some characteristics of face patterns. By constraining the example set of non-face patterns in this manner, the number of such patterns is limited so as not to become intractably large. A boot-strap strategy is used to incrementally select non-face patterns as follows:

1. Start with a small, incomplete set of non-face examples in database section 154.

2. Train MLP net 304 with the current database 150 of examples.

3. Run system 100 on a sequence of random images and collect all non-face patterns that are incorrectly classified as faces; add these patterns to the non-face section 154 of image database 150.

4. Return to step 2.

At the end of each such iteration, additional non-face patterns are stored in non-face section 154 of image database 150, based on incorrect classification of system 100. In this manner, system 500 is steered away from the types of misclassifications that it makes in each iteration, and the performance of system 100 therefore improves with each iteration.

It should be recognized that this same technique may be used to enlarge the set of face patterns stored in section 152 of image database 150, and that new face prototypes and non-face prototypes may be determined after such iterations in order to more accurately model the distribution of face patterns.

Referring again to FIG. 1, in one embodiment system 100 is configured so that output device 114 displays a replica of a novel applied image with a rectangle outlining any window portion of such applied image that is recognized as containing a face. In one embodiment, several overlapping rectangles of various sizes and placements may be so produced for portions of an image in which a face is strongly recognized, as the face may produce recognition at various window scales and offsets. Weakly recognized faces, on the other hand, may result in only one or a few such rectangles being displayed. In alternate embodiments, a simple yes/no indication may be provided on output display device 114 to indicate whether a face is detected in an applied image.

In a preferred embodiment, the distance metric used for comparison of a window pattern in an applied image to each of the 12 prototype centers is a measure having two components: a first, Mahalanobis-based distance between the test pattern and the prototype center and a second, Euclidean-based distance between the test pattern and its projection in a lower-dimensional subspace. This metric is found to return small distances between face patterns and face prototypes, and to yield either small distances between non-face patterns and non-face prototypes or large distances between non-face patterns and face prototypes.

This two-value distance measure takes into account both the detailed shape of the prototype cluster and the reliability of the shape estimate. The first of the two values provides a Mahalanobis-like distance between the test pattern and the prototype center, defined within a lower-dimensional subspace of the original 19×19 dimensional image window vector space. The sub-space is spanned by the larger eigenvectors of the prototype cluster. This distance component is directionally weighted to reflect the test pattern's location relative to the major elongation directions in the local data distribution around the prototype center.

The second value is a normalized Euclidean distance between the test pattern and its projection in the lower dimensional sub-space, and is a uniformly weighted distance component.

More specifically, the first component of the distance measure is best described after a brief review of Mahalanobis distances. Further information concerning such distances is provided in A. Mahalanobis, et al., *Multi-Class SAR ATR Using Shift-Invariant Correlation Filters*, PATTERN RECOGNITION, 27(4):619–626, Apr. 1994, the teachings of which are incorporated herein by reference.

If $\chi$ is a column vector test pattern, and $\mu$ is a prototype center column vector having a covariance matrix $\Sigma$ of its local distribution, the Mahalanobis distance between the test pattern and the prototype center is given by:

$$M(x,\mu)=(\chi-\mu)^T\Sigma^{-1}(x-\mu) \quad \text{Eq. 1}$$

A prototype cluster may be thought of geometrically as a best-fit multidimensional Gaussian distribution centered at $\mu$ with covariance matrix $\Sigma$; all points at a given Mahalanobis distance from $\mu$ will occupy a constant density surface in this multi-dimensional vector space. A closely related distance measure, called a normalized Mahalanobis distance, may then be given by:

$$M_n(x,\mu)=(\tfrac{1}{2})(d\ln 2\pi+\ln|\Sigma|+(\chi-\mu)^T\Sigma^{-1}(x-\mu)) \quad \text{Eq. 2}$$

Here, d is the vector space dimensionality and $|\Sigma|$ means the determinant of $\Sigma$. This normalized Mahalanobis distance is, therefore, the negative natural logarithm of the best-fit Gaussian distribution described above, and is normalized in the sense that it originates directly from a probability distribution that integrates to unity. It is found that system 100 is more stable when this normalized Mahalanobis distance is used rather than the classical Mahalanobis distance. Both of these distances are advantageous in establishing the class identity of test patterns because they measure pattern differences in a distribution dependent manner, unlike the Euclidean distance that measures pattern differences in an absolute sense. More specifically, the distances they measure are indicative of the test pattern's location relative to the overall location of other known patterns in the pattern class. In this sense, Mahalanobis distances capture very well the notion of "similarity" or "dissimilarity" between the test pattern and a pattern class.

In a preferred embodiment, the Mahalanobis distance used as part of the distance metric is defined within a 75-dimensional sub-space of the original image window vector space, spanned by the 75 largest eigenvectors of the current prototype cluster. This first value locates and characterizes the test pattern relative to the cluster's major directions of data distribution. The value is determined as follows.

If $\chi$ is the column vector test pattern being analyzed, $\mu$ is the prototype being analyzed, $E_{75}$ is a matrix with 75 columns, where column i is a unit vector in the direction of the cluster's $i^{th}$ largest eigenvector, and $W_{75}$ is a diagonal matrix of the corresponding 75 largest eigenvalues. The covariance matrix for the cluster's data distribution in the 75 dimensional sub-space is given by $$\Sigma_{75} = (E_{75} W_{75} E^T_{75}) \qquad \text{Eq. 3}$$

and the first distance value is:

$$D_1(\chi,\mu) = (\tfrac{1}{2})(75 \ln 2\pi + \ln |\Sigma_{75}| + (\chi-\mu)^T \Sigma_{75}^{-1}(\chi-\mu)) \qquad \text{Eq. 4}$$

The second component of the distance metric is a standard Euclidean distance between the test pattern and its projection in the 75 dimensional sub-space. This distance component accounts for pattern differences not captured by the first component, namely pattern differences within the sub-space spanned by the smaller eigenvectors. This second component is given by the $L_2$ norm of the displacement vector between $\chi$ and its projection $\chi_p$:

$$D_2(\chi,\mu) = \|(\chi - \chi_p)\| = \|(I - E_{75} E_{75}^T)(\chi-\mu)\| \qquad \text{Eq. 5}$$

In practice, it is found that use of these two values for a distance metric provides results that are superior to those obtained using either value individually or using a standard Mahalanobis distance.

Figure 4:
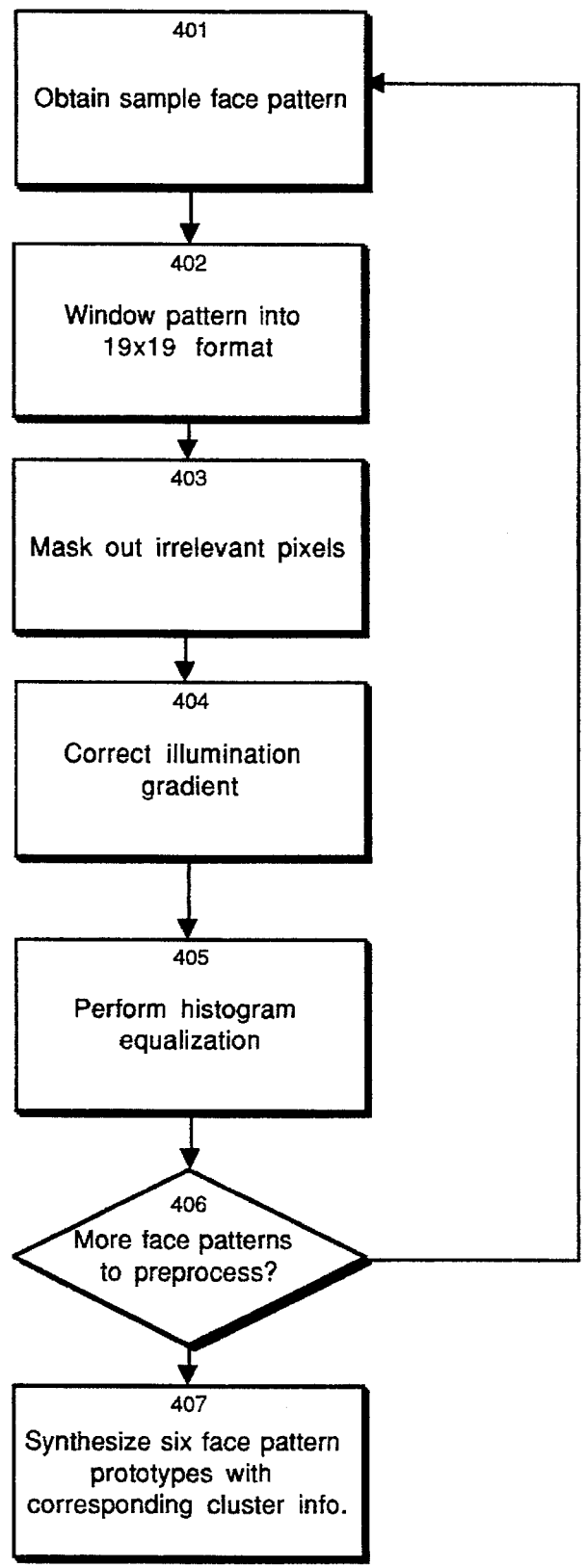
FIG. 4 illustrates a flow diagram of face pattern prototype synthesis, in accordance with the present invention.

Referring now to FIG. 4, there is shown a flow diagram of processing for the synthesis of face pattern prototypes, in accordance with the present invention. Processing commences by obtaining 401 a sample face pattern, for instance from a database of "mug shot" images. The pattern is then windowed 402 into a 19×19 format by re-scaling the sample pattern into an image 19 pixels wide and 19 pixels high. Next, the outermost pixels at the corners of this 19×19 format window are masked out 403 as corresponding to background that is not relevant to the face detection task and that, accordingly, should not be encoded. An illumination gradient correction 404 is then applied to improve the information content of the pattern, for instance by reducing the strength of heavy shadows caused by extreme lighting angles. In a preferred embodiment, this operation is performed by subtracting a best-fit brightness plane from the unmasked window pixels, as discussed above. Finally, a histogram equalization operation 405 is performed to adjust for various geometry independent sources of window pattern variation, including changes in illumination brightness and differences in camera response curves.

Once preprocessing 402–405 has been performed on the current face pattern, a check 406 is made to see whether additional face patterns are available. If so, processing returns to 401 where another face pattern is obtained and preprocessed. Otherwise, six face pattern prototypes with corresponding cluster information are synthesized 407 using the modified k-means clustering technique detailed above.

Figure 5:
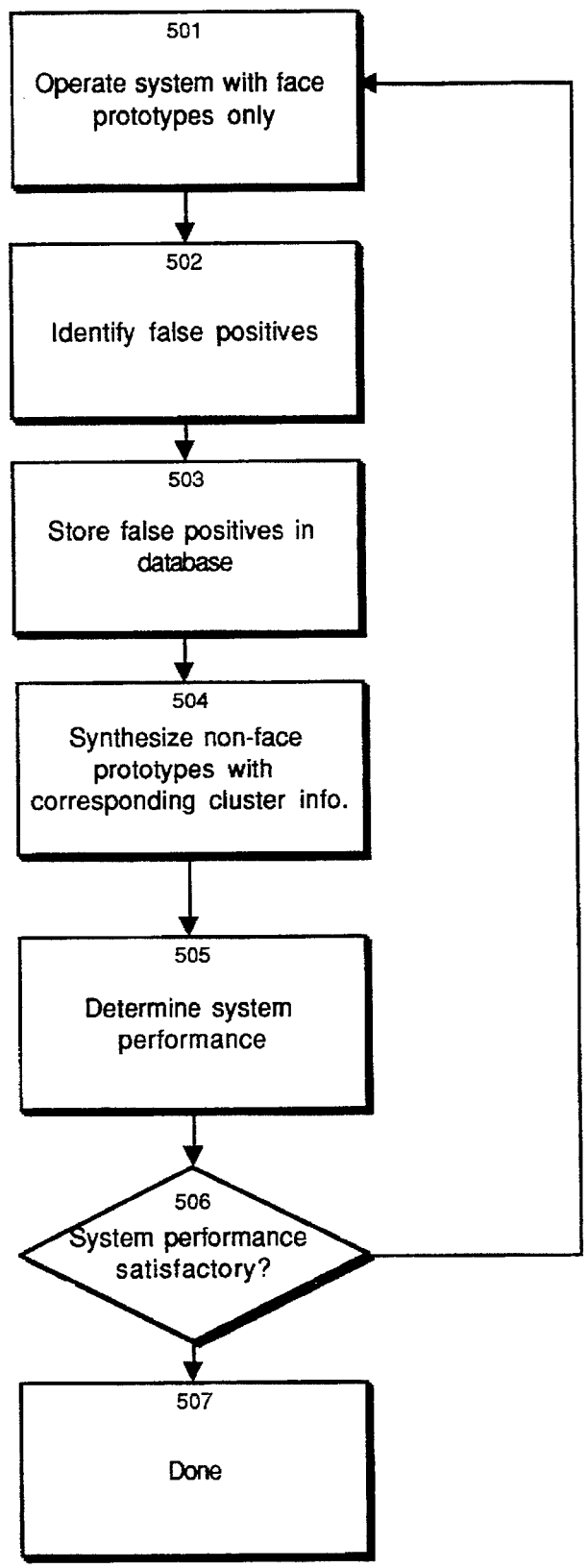
FIG. 5 illustrates a flow diagram of non-face pattern prototype synthesis, in accordance with the present invention.

Referring now to FIG. 5, there is shown a flow diagram of processing for the synthesis of non-face pattern prototypes, in accordance with the present invention. Processing commences by operating 501 system 100 using only face prototypes to detect faces in a set of random images. In so operating system 100, it is found that some of the applied random images are incorrectly detected as faces, and these false positives are identified 502 and stored 503 in the non-face pattern section 154 of image database 150. The modified k-means technique described above is then used to synthesize 504 a set of six non-face prototypes with their corresponding cluster covariance matrices. The prototypes having been synthesized, a check 506 is made to determine whether the performance of system 100 using these six non-face prototypes along with the six previously determined face prototypes is satisfactory. If so, processing is complete 507. Otherwise, a new set of six non-face prototypes is determined by iterating processing beginning with operation 501 of system 100.

Figure 6:
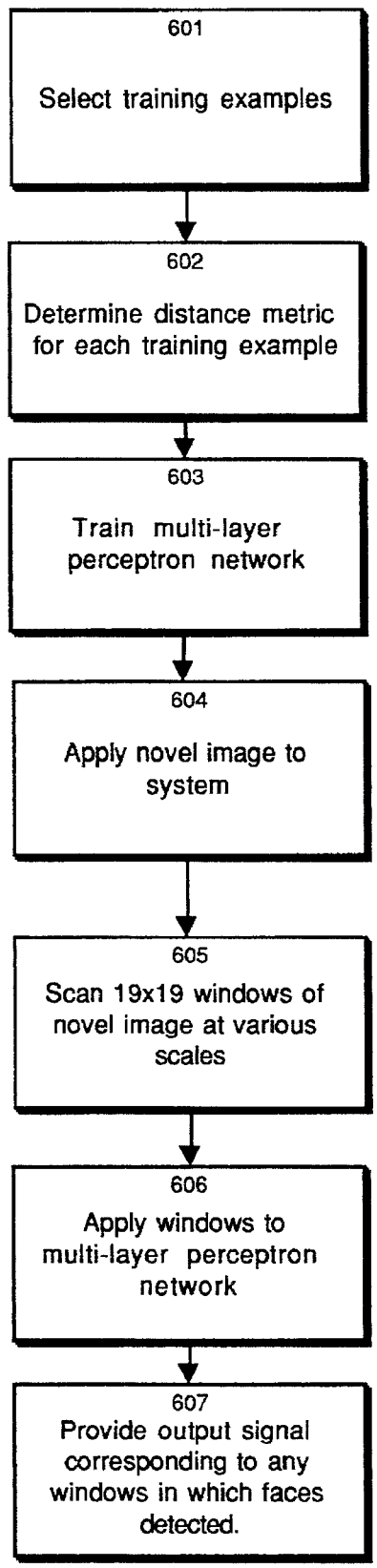
FIG. 6 illustrates a flow diagram of face detection processing, in accordance with the present invention.

Referring now to FIG. 6, there is shown a flow diagram of processing corresponding to the overall operation of system 100 to detect faces. Processing commences by selecting 601 a set of training examples for MLP net 304. In a preferred embodiment, a database of nearly 50,000 window patterns, containing approximately 4000 face patterns with the remainder representing non-face patterns, is employed. The two-value distance metric discussed above is then determined 602 for each training example. MLP net 304 is then trained 603 with these data in the conventional backpropagation manner until the output error has stabilized at an acceptably small value.

Once MLP net 304 has been trained, run-time operation of system 100 is possible. Run-time operation commences by applying 604 a novel image to system 100. Processing then scans 605 the applied image to create 19×19 windows. Specifically, all possible portions of the image for which a 19×19 window can be formed are considered. Accordingly, a sliding 19×19 pixel window is applied to the image and moved incrementally over the image, one pixel at a time, so as to obtain all possible full-scale 19×19 windows. The image is also incrementally scaled so that larger and smaller image portions will fit within a 19×19 image portion, and such a 19×19 window is again moved incrementally over the scaled image. In practice, the 19×19 pixel window size is found to keep the dimensionality of the window vector space manageably small while maintaining enough detail to visually distinguish between face and non-face patterns.

Next, each such 19×19 window pattern is applied 606 to MLP net 304. More specifically, the pattern itself is applied to image classifier 106, where distance metric processor 302 determines distances from that pattern to the face and non-face prototypes. The distance information representing the pattern is then applied to MLP net 304. Based on this applied information, MLP net 304 then provides 607 a face detection signal 330 as output that indicates whether the current window pattern is a face pattern or a non-face pattern. In a preferred embodiment, this information is presented to the user by superimposing an outline of a rectangle representing the current window over a replica of the applied input image. As a result, the faces in an applied input image are each framed by one or more such rectangles. Due to the scaling and incremental movement of the windows, some faces may be surrounded by more than one such rectangle.

It should be recognized that although the discussion above has focused on detection of human faces, the system and method of the present invention readily may be applied to detecting other types of patterns in many other types of images as well. It should also be recognized that with suitable training, system 100 may be used to recognize faces or other pattern types over as wide or narrow a range of poses, angles, expressions, and the like as desired. For instance, with proper training examples, system 100 may learn to detect only smiling faces, or only children's faces. As examples of other applications to which system 100 may be adapted, system 100 may readily be trained for use in industrial applications such as defect detection in manufactured products, or for terrain feature classification applications for SAR imagery. Furthermore, system 100 need not be limited to a two-outcome result, e.g., face or non-face. By properly training MLP net 304, multiple-outcome detection is possible in which a window may be classified as, for instance, containing no face, a male adult face, a female adult face or a child's face. In this manner, the face detection capabilities of system 100 provide some level of face recognition as well.

Therefore, pattern type detection is achieved by teaching a neural network to distinguish distance measures between a set of prototypes representative of one type of pattern and a set of prototypes representative of other types of patterns. The above description is included to illustrate the operation of preferred embodiments and is not meant to limit the scope of the invention. The scope of the invention is to be limited only by the following claims. From the above discussion, many variations will be apparent to those skilled in the art that would yet be encompassed by the spirit and scope of the invention.

We claim:

1. A method of detecting the presence of a predetermined pattern type in an applied image, the method comprising:
   (a) synthesizing a network by:
      (i) generating a first set of prototypes representative of the predetermined pattern type;
      (ii) generating a second set of prototypes not representative of the predetermined pattern type by operating the network with the first set of prototypes, identifying a set of problem images yielding false positives when applied to the network, and using the problem images to form the second set of prototypes; and
      (iii) training the network by application of training images, for which it is known whether each such training image is representative of the predetermined pattern type; and
   (b) operating the network by:
      (i) preprocessing the applied image to obtain a preprocessed applied image;
      (ii) determining a distance metric between the preprocessed applied image and each of the first and second sets of prototypes to obtain a plurality of distance metrics;
      (iii) applying said plurality of distance metrics to said network; and
      (iv) producing a detection signal indicative of whether the applied image is representative of the predetermined pattern type.

2. A method as in claim 1, wherein the training further comprises determining a distance metric between each of the training images and each of the first and second sets of prototypes to obtain a plurality of training distance metrics, and applying said plurality of training distance metrics to said network.

3. A method as in claim 1, wherein the distance metric includes a first component based on a Mahalanobis-based distance measure.

4. A method as in claim 3, wherein the distance metric includes a second component based on a Euclidean-based distance measure.

5. A method as in claim 1, wherein training the network further includes operating the network, identifying additional problem images yielding false positives when applied to the network, and using the additional problem images to augment the second set of prototypes.

6. A method as in claim 1, wherein the preprocessing includes masking, image resizing, brightness correction, and histogram equalization.

7. A method as in claim 1, further comprising scaling and scanning the applied image into a plurality of uniformly sized windows for application to the network.

8. A method as in claim 1, wherein said applied image is one of a plurality of overlapping portions of an overall image, wherein the image classifier further determines a strength of detection based on how many of said overlapping portions when applied to said image classifier result in said detection signal being indicative of the presence of said predetermined pattern type.

9. A method as in claim 1, wherein said first set of prototypes is generated from a set of example images by collecting the set of example images and by collecting a second set of images obtained by taking a mirror image of each of the set of example images.

10. A method as in claim 1, wherein said first set of prototypes is generated from a set of example images by collecting the set of example images and by collecting a third set of images obtained by taking a rotated version of each of the set of example images.

11. A method as in claim 1, wherein said image is one of a plurality of overlapping portions of an overall image, wherein said method further includes operating said network with respect to each of said overlapping portions, and wherein said method further includes determining a strength of detection based on how many of said overlapping portions result in said detection signal being indicative of said predetermined pattern type.

12. A system for detecting the presence of a predetermined pattern type in an applied image, the system comprising:
   a pattern prototype synthesizer including a preprocessor, an image database, and a prototype generator, the preprocessor normalizing and filtering a plurality of example patterns, the image database storing the plurality of example patterns and having a first section and a second section, the first section containing first example patterns representative of the predetermined pattern type and the second section containing second example patterns not representative of the predetermined pattern type, the second example patterns being generated from images applied to the system for which the predetermined pattern type is falsely detected, and the prototype generator forming prototype patterns based on the example patterns; and
   an image classifier operatively coupled to the pattern prototype synthesizer, the image classifier including a distance metric processor producing a distance measure representative of a distance between the applied image and each of the prototype patterns, and a network operatively coupled to the distance metric processor, the network accepting as input the distance measure and producing as output a detection signal representative of the presence of the predetermined pattern type in the applied image.

13. A system as in claim 12, wherein said preprocessor further normalizes and filters the applied image.

14. A system as in claim 12, wherein the distance measure produced by the distance metric processor includes a first Mahalanobis-based component.

15. A system as in claim 14, wherein the distance measure produced by the distance metric processor includes a second Euclidean-based component.

16. A system as in claim 12, wherein the preprocessor includes a window resizer, a masker, a brightness corrector, and a histogram equalizer.

17. A system as in claim 12, wherein said preprocessor is adapted to scale and scan said applied image to produce a plurality of uniformly sized pattern windows, and wherein said image classifier is adapted to accept as input each of said pattern windows.

18. A system as in claim 12, wherein said prototype generator forms prototype patterns from mirror images of said example patterns.

19. A system as in claim 12, wherein said prototype generator forms prototype patterns from rotated versions of said example patterns.

* * * * *